US010466822B2

(12) United States Patent
Kim et al.

(10) Patent No.: US 10,466,822 B2
(45) Date of Patent: Nov. 5, 2019

(54) ELECTRONIC DEVICE INCLUDING DISPLAY AND METHOD FOR MANUFACTURING DISPLAY

(71) Applicant: SAMSUNG ELECTRONICS CO., LTD., Suwon-si, Gyeonggi-do (KR)

(72) Inventors: Sang Seob Kim, Suwon-si (KR); Su Yeon Kim, Suwon-si (KR); Kwang Tai Kim, Yongin-si (KR); Ju Yeong Lee, Seoul (KR); Hyun Ju Hong, Osan-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 25 days.

(21) Appl. No.: 15/828,671

(22) Filed: Dec. 1, 2017

(65) Prior Publication Data

US 2018/0157362 A1 Jun. 7, 2018

(30) Foreign Application Priority Data

Dec. 2, 2016 (KR) .................. 10-2016-0163632

(51) Int. Cl.
*G06F 3/041* (2006.01)
*G02F 1/1335* (2006.01)
(Continued)

(52) U.S. Cl.
CPC ...... *G06F 3/0412* (2013.01); *G02F 1/133528* (2013.01); *G06F 3/041* (2013.01);
(Continued)

(58) Field of Classification Search
USPC .......... 345/173, 184, 174, 156; 349/58, 130; 313/504
See application file for complete search history.

(56) References Cited

U.S. PATENT DOCUMENTS

| 8,350,792 B2 | 1/2013 | Igeta et al. |
| 8,487,864 B2 | 7/2013 | Itoh |

(Continued)

FOREIGN PATENT DOCUMENTS

| CN | 104898883 | 9/2015 |
| JP | 5214613 | 6/2013 |

(Continued)

OTHER PUBLICATIONS

Search Report dated Apr. 5, 2018 in counterpart European Patent Application No. 17205001.5.

*Primary Examiner* — Thuy N Pardo
(74) *Attorney, Agent, or Firm* — Nixon & Vanderhye P.C.

(57) ABSTRACT

An electronic device is disclosed. The electronic device includes a display panel, a partial region of the display panel including an active region configured to output light and including a cut in a thickness direction of the display panel, a touch sensor formed on the display panel, a partial region of the touch sensor corresponding to the cut region of the display panel, including a cut in a thickness direction of the touch sensor, and a polarizing plate disposed on the display panel, a partial region of the polarizing plate corresponding to the cut region of the display panel, including a cut in a thickness direction of the polarizing plate, and a cut surface of the display panel, a cut surface of the touch sensor, and a cut surface of the polarizing plate are formed to coincide with each other.

20 Claims, 13 Drawing Sheets

(51) Int. Cl.
*H04N 5/225* (2006.01)
*G02F 1/1333* (2006.01)

(52) U.S. Cl.
CPC ....... *H04N 5/2257* (2013.01); *G02F 1/13338* (2013.01); *G06F 2203/04103* (2013.01)

(56) References Cited

U.S. PATENT DOCUMENTS

| | | | |
|---|---|---|---|
| 9,017,130 | B1 | 4/2015 | Na et al. |
| 9,143,668 | B2 | 9/2015 | Matthew et al. |
| 9,964,810 | B2 | 5/2018 | Watanabe et al. |
| 10,101,860 | B2 * | 10/2018 | Marques ................. G06F 3/044 345/174 |
| 2010/0026611 | A1 | 2/2010 | Igeta et al. |
| 2010/0141850 | A1 | 6/2010 | Itoh |
| 2012/0105400 | A1 | 5/2012 | Matthew et al. |
| 2012/0206669 | A1 * | 8/2012 | Kim ...................... G06F 1/1686 349/58 |
| 2013/0094126 | A1 | 4/2013 | Rappoport et al. |
| 2013/0258234 | A1 * | 10/2013 | Park .................. G02F 1/133512 349/58 |
| 2015/0126092 | A1 | 5/2015 | Na et al. |
| 2015/0241732 | A1 * | 8/2015 | Kim ...................... G06F 1/1686 349/58 |
| 2016/0011633 | A1 * | 1/2016 | Watanabe ............. G02F 1/1333 345/184 |
| 2016/0021746 | A1 | 1/2016 | Wright et al. |
| 2016/0088692 | A1 * | 3/2016 | Weber ................... H05B 33/02 313/504 |
| 2016/0202516 | A1 * | 7/2016 | Watanabe ............. G02F 1/1339 349/130 |
| 2016/0212311 | A1 * | 7/2016 | Mathew ............... H04N 5/2251 345/173 |
| 2016/0274396 | A1 | 9/2016 | Nie |
| 2018/0024666 | A1 * | 1/2018 | Marques ................. G06F 3/044 345/174 |

FOREIGN PATENT DOCUMENTS

| | | |
|---|---|---|
| KR | 10-2013-0027335 | 3/2013 |
| KR | 10-2015-0032359 | 3/2015 |
| KR | 10-2015-0052457 | 5/2015 |

* cited by examiner

ELECTRONIC DEVICE INCLUDING DISPLAY AND METHOD FOR MANUFACTURING DISPLAY

CROSS-REFERENCE TO RELATED APPLICATION

This application is based on and claims priority under 35 U.S.C. § 119 to a Korean patent application filed on Dec. 2, 2016 in the Korean Intellectual Property Office and assigned Serial number 10-2016-0163632, the disclosure of which is incorporated by reference herein in its entirety.

TECHNICAL FIELD

The present disclosure relates generally to a method for manufacturing a display and a display manufactured by the method.

BACKGROUND

With the development of electronic technologies, various types of electronic products are being developed and distributed. In particular, an electronic device, which has various functions, such as a smartphone, a tablet PC, a wearable device, or the like is being widely supplied nowadays.

The above-described electronic device may include a display for outputting visual information as an output device. The research and development is being made to maximize the area of the display in the electronic device with a limited size. In the case where the area of the display in the electronic device of the limited size increases, a structure of the display, an internal structure of the electronic device, and the arrangement of modules included in the electronic device may be changed. For example, a partial portion of the display may be cut for exposure of a camera module, and the camera module may be disposed in the cut portion.

The display may include a display panel, a touch sensor, a polarizing plate, an adhesive layer, a cover glass, etc. To adhere the display panel, the touch sensor, the polarizing plate, the adhesive layer, etc. together, steps for attachment may be present between layers. For example, in the case where the display panel and the polarizing plate are attached to each other, the step between the display panel and the polarizing plate may be ±0.316 mm. In the case where the step is present between the above-described layers, the area of an inactive region (or a black matrix (BM) region) of the display may increase.

Meanwhile, a rate by which the display occupies a front surface of the electronic device may increase to enlarge the size of the display. In this case, a hole may be formed in the display to secure a space for disposing a camera module, a receiver, an illuminance sensor, and/or a proximity sensor. In the case where the hole is defined in the display, the area of the inactive region adjacent to the hole may increase for wirings such as a data line and/or a scan line.

SUMMARY

Example aspects of the present disclosure address at least the above-mentioned problems and/or disadvantages and provide at least the advantages described below. Accordingly, an example aspect of the present disclosure is to provide an electronic device including a display in which the area of the above-described inactive region decreases and a method for manufacturing the electronic device.

In accordance with an example aspect of the present disclosure, the electronic device may include a display panel, a partial region of the display panel including an active region configured to output light and including a cut in a thickness direction of the display panel, a touch sensor formed on the display panel, a partial region of the touch sensor corresponding to the cut region of the display panel including a cut in a thickness direction of the touch sensor, and a polarizing plate disposed on the display panel, a partial region of the polarizing plate corresponding to the cut region of the display panel including a cut in a thickness direction of the polarizing plate, wherein a cut surface of the display panel, a cut surface of the touch sensor, and a cut surface of the polarizing plate may be formed to coincide with each other.

In accordance with another example aspect of the present disclosure, an electronic device may include a display panel, a partial region of the display panel including an active region configured to output light and including a cut in a thickness direction of the display panel, a touch sensor formed on the display panel, a partial region of the touch sensor corresponding to the cut region of the display panel, including a cut in a thickness direction of the touch sensor, and a polarizing plate disposed on the display panel, a partial region of the polarizing plate corresponding to the cut region of the display panel, including a cut in a thickness direction of the polarizing plate, wherein a cut surface of the display panel, a cut surface of the touch sensor, and a cut surface of the polarizing plate may be formed to coincide with each other.

In accordance with another example aspect of the present disclosure, an electronic device may include a display panel, a partial region of the display panel including an active region configured to output light and including a cut in a thickness direction of the display panel, a touch sensor formed on the display panel, a partial region of the touch sensor corresponding to the cut region of the display panel, including a cut in a thickness direction of the touch sensor, and a polarizing plate disposed on the display panel, a partial region of the polarizing plate corresponding to the cut region of the display panel, including a cut in a thickness direction of the polarizing plate, wherein the cut region of the display panel, the cut region of the touch sensor, and the cut region of the polarizing plate may be cut at the same time.

According to embodiments of the present disclosure, the area of an inactive region due to steps between a plurality of layers included in a display may decrease by adhering a plurality of elements included in the display together and cutting the elements at the same time.

Also, the area of an inactive region due to data lines may decrease by forming vias in a display panel and connecting the data lines through the vias.

Also, the area of an inactive region due to data lines and/or scan lines may be decreased by driving the display using a plurality of display driver integrated circuit (DDI).

Moreover, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various example embodiments of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
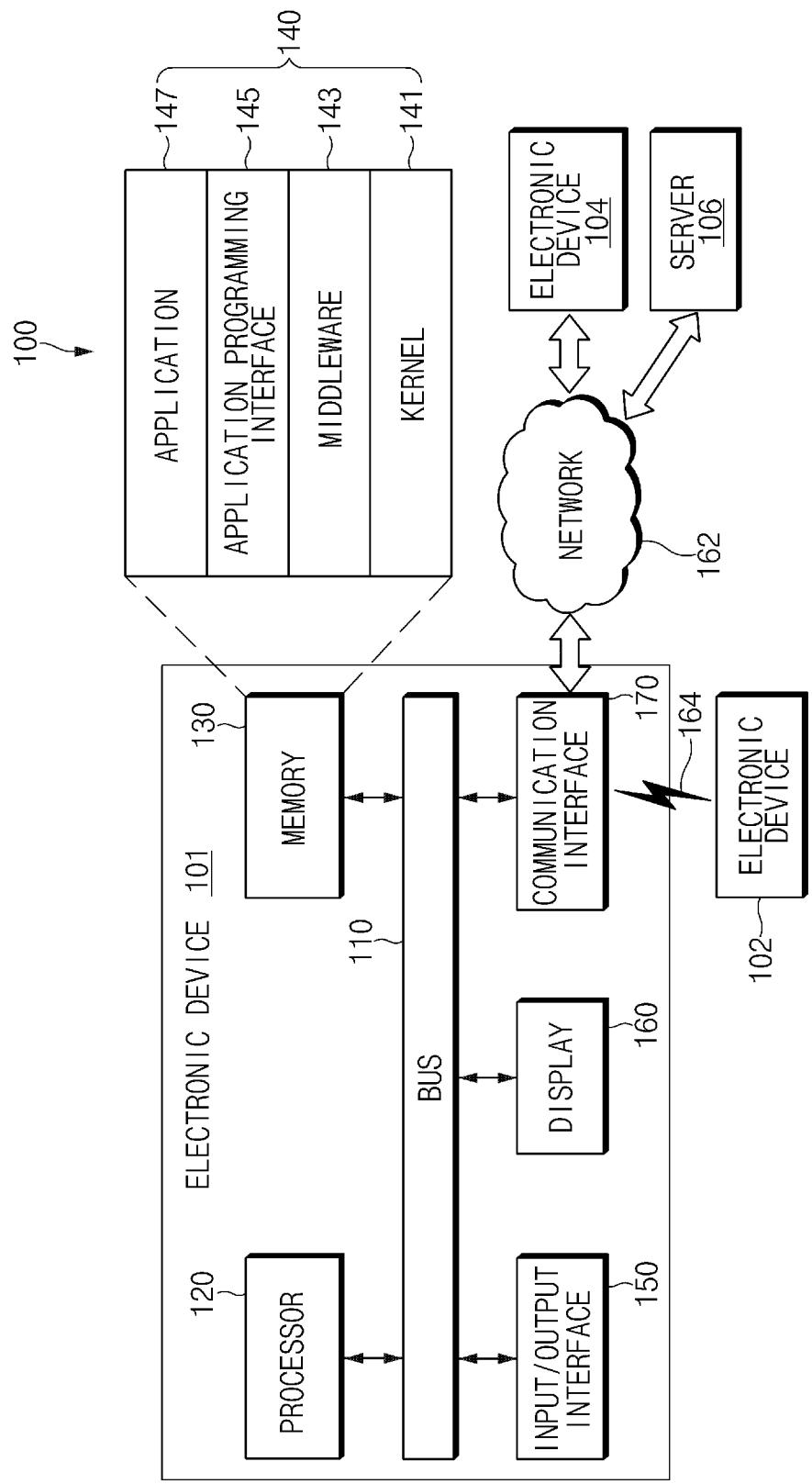
FIG. 1 is a block diagram illustrating an example electronic device in a network environment according to various example embodiments.

Hereinafter, various example embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals. The terms of a singular form may include plural forms unless otherwise specified. In this disclosure, the expressions "A or B", "at least one of A or/and B", or "one or more of A or/and B", and the like may include any and all combinations of one or more of the associated listed items. The terms, such as "first", "second", and the like may be used to refer to various elements regardless of the order and/or the priority and to distinguish the relevant elements from other elements, but do not limit the elements. When an element (e.g., a first element) is referred to as being "(operatively or communicatively) coupled with/to" or "connected to" another element (e.g., a second element), the element may be directly coupled with/to or connected to the other element or an intervening element (e.g., a third element) may be present.

According to the situation, the expression "configured to" used in this disclosure may be used interchangeably with, for example, the expression "suitable for", "having the capacity to", "adapted to", "made to", or "capable of", or "designed to" in hardware or software. The expression "a device configured to" may refer to a situation in which the device is "capable of" operating together with another device or other components. For example, a "processor configured to (or set to) perform A, B, and C" may refer to a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit), or the like, but is not limited thereto. According to various embodiments, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, or the like, but is not limited thereto.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, drones, automatic teller's machines (ATMs), points of sales (POSs) of stores, or internet of things (e.g., light bulbs, various sensors, sprinkler devices, fire alarms, thermostats, street lamps, toasters, exercise equipment, hot water tanks, heaters, boilers, and the like), or the like, but is not limited thereto. According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like), or the like, but is not limited thereto. According to various embodiments, the electronic device may be a flexible electronic device or a combination of two or more above-described devices. Furthermore, an electronic device according to an embodiment of this disclosure may not be limited to the above-described electronic devices. In this disclosure, the term "user" may refer to a person who uses an electronic device or may refer to a device (e.g., an artificial intelligence electronic device) that uses the electronic device.

Referring to FIG. 1, according to various example embodiments, an electronic device 101 in a network environment is described. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. According to an embodiment, the electronic device 101 may not include at least one of the above-described elements or may further include other element(s). The bus 110 may interconnect the above-described elements 110 to 170 and may include a circuit for conveying communications (e.g., a control message and/or data) among the above-described elements. The processor 120 may include various processing circuitry, such as, for example, and without limitation, one or more of a dedicated processor, a central processing unit (CPU), an application processor (AP), or a communication processor (CP), or the like. For example, the processor 120 may perform an arithmetic operation or data processing associated with control and/or communication of at least other elements of the electronic device 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)". For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data. Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147 and may process the one or more task requests. The API 145 may be an interface through which the application program 147 controls a function provided by the kernel 141 or the middleware 143, and may include, for example, at least one interface or function (e.g., an instruction) for a file control, a window control, image processing, a character control, or the like. The input/output interface 150 may transmit an instruction or data input from a user or another external device, to other element(s) of the electronic device 101 or may output an instruction or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display, or the like, but is not limited thereto. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may include various communication circuitry and establish communication between the electronic device 101 and an external device (e.g., the first electronic device 102, the second electronic device 104, or the server 106). For example, the communication interface 170 may be connected to the network 162 over wireless communication or wired communication to communicate with the external device (e.g., the second electronic device 104 or the server 106). Additionally, the communication interface 170 may establish a short-range wireless communication connection 164 with, for example, and without limitation, a first electronic device 102, a network 162, or the like.

For example, the wireless communication may include cellular communication using at least one of long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like. The wireless communication may include at least one of wireless fidelity (Wi-Fi), Bluetooth, Bluetooth low energy (BLE), Zigbee, near field communication (NFC), magnetic stripe transmission (MST), radio frequency (RF), a body area network, or the like. According to an embodiment, the wireless communication may include GNSS. The GNSS may be one of, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), powerline communication, a plain old telephone service (POTS), or the like. The network 162 may include at least one of telecommunications networks, for example, a computer network (e.g., LAN or WAN), an Internet, or a telephone network.

Each of the first and second electronic devices 102 and 104 may be a device of which the type is different from or the same as that of the electronic device 101. According to various embodiments, all or a portion of operations that the electronic device 101 will perform may be executed by another or plural electronic devices (e.g., the first electronic device 102, the second electronic device 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 at other electronic device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
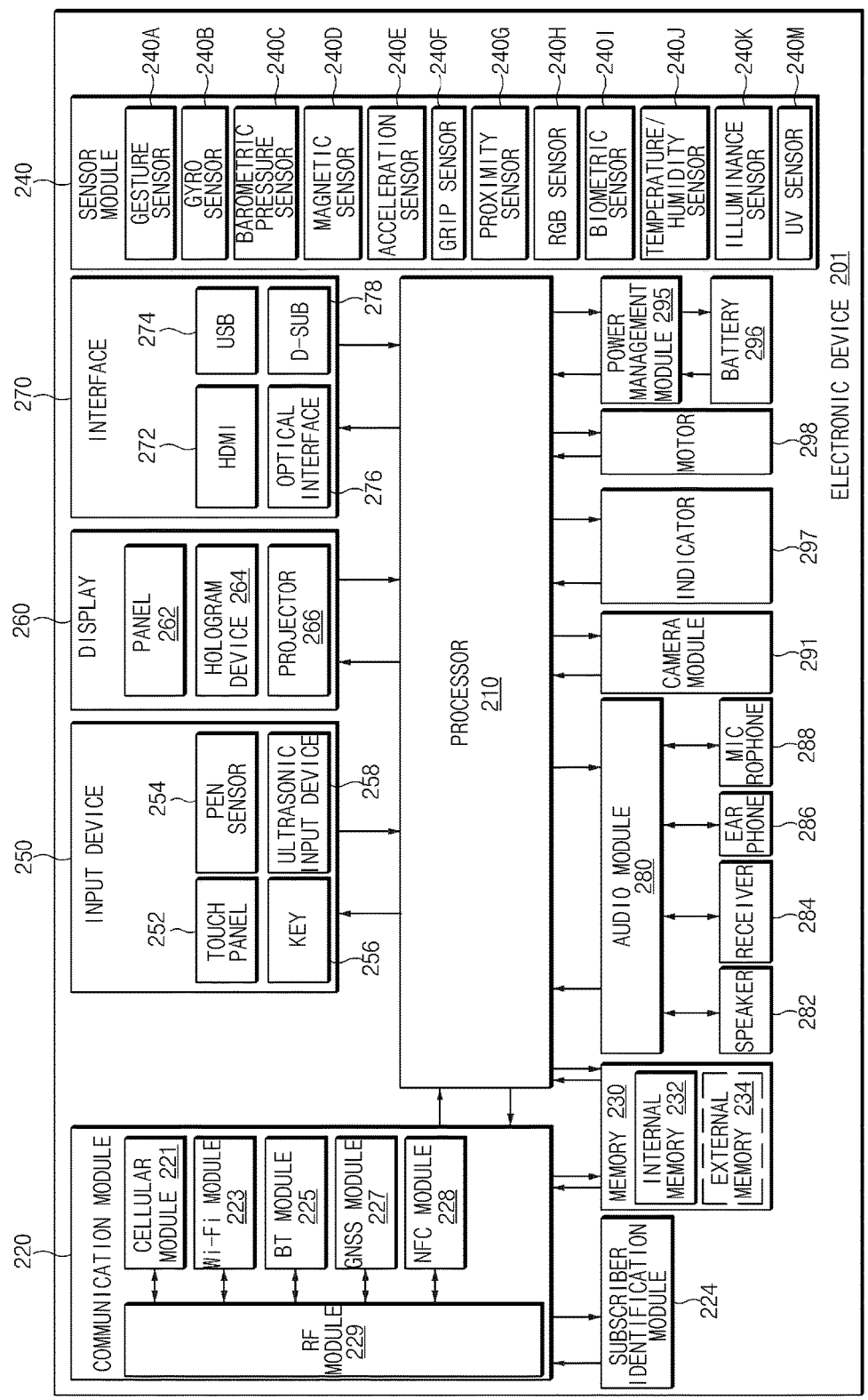
FIG. 2 is a block diagram illustrating an example electronic device according to various example embodiments.

FIG. 2 is a block diagram illustrating an example electronic device, according to various embodiments. An electronic device 201 may include, for example, all or a part of the electronic device 101 illustrated in FIG. 1. The electronic device 201 may include one or more processors (e.g., an application processor (AP)) (e.g., including processing circuitry) 210, a communication module (e.g., including communication circuitry) 220, a subscriber identification module 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of elements illustrated in FIG. 2. The processor 210 may load an instruction or data, which is received from at least one of other elements (e.g., a nonvolatile memory), into a volatile memory and process the loaded instruction or data. The processor 210 may store result data in the nonvolatile memory.

The communication module 220 may be configured the same as or similar to the communication interface 170 of FIG. 1. The communication module 220 may include various communication circuitry, such as, for example, and without limitation, one or more of the cellular module 221, a Wi-Fi module 223, a Bluetooth (BT) module 225, a GNSS module 227, a near field communication (NFC) module 228, and a radio frequency (RF) module 229. The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 224. According to an embodiment, the cellular module 221 may perform at least a portion of functions that the processor 210 provides. According to an embodiment, the cellular module 221 may include a communication processor (CP). According to an embodiment, at least a part (e.g., two or more) of the cellular module 221, the Wi-Fi module 223, the BT module 225, the GNSS module 227, or the NFC module 228 may be included within one Integrated Circuit (IC) or an IC package. For example, the RF module 229 may transmit and receive a communication signal (e.g., an RF signal). For example, the RF module 229 may include a transceiver, a power amplifier module (PAM), a frequency filter, a low noise amplifier (LNA), an antenna, or the like. According to another embodiment, at least one of the cellular module 221, the Wi-Fi module 223, the BT module 225, the GNSS module 227, or the NFC module 228 may transmit and receive an RF signal through a separate RF module.

The subscriber identification module 224 may include, for example, a card and/or embedded SIM that includes a subscriber identification module and may include unique identity information (e.g., integrated circuit card identifier (ICCID)) or subscriber information (e.g., international mobile subscriber identity (IMSI)).

The memory 230 (e.g., the memory 130) may include an internal memory 232 and/or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 234 may include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

The sensor module 240 may measure, for example, a physical quantity or may detect an operation state of the electronic device 201. The sensor module 240 may convert the measured or detected information to an electrical signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or generally, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include various input circuitry, such as, for example, and without limitation, one or more of a touch panel 252, a (digital) pen sensor 254, a key 256, or an ultrasonic input unit 258, or the like. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user. The (digital) pen sensor 254 may be, for example, a part of a touch panel or may include an additional sheet for recognition. The key 256 may include, for example, a physical button, an optical key, or a keypad. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, a projector 266, and/or a control circuit for controlling the panel 262, the hologram device 264, or the projector 266. The panel 262 may be implemented, for example, to be flexible, transparent or wearable. The panel 262 and the touch panel 252 may be integrated into a single module. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. The hologram device 264 may display a stereoscopic image in a space using a light interference phenomenon. The projector 266 may project light onto a screen so as to display an image. For example, the screen may be arranged in the inside or the outside of the electronic device 201.

The interface 270 may include, various interface circuitry, such as, for example, and without limitation, one or more of a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or generally, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288. For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp). The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. The electronic device 201 may include a processing device (e.g., a GPU) for supporting a mobile TV. The processing device for supporting the mobile TV may process media data according to the standards of digital multimedia broadcasting (DMB), digital video broadcasting (DVB), MediaFLO™, or the like. Each of the above-mentioned elements of the electronic device according to various embodiments of the present disclosure may be configured with one or more components, and the names of the elements may be changed according to the type of the electronic device. In various embodiments, some elements of the electronic device (e.g., the electronic device 201) may be omitted or other additional elements may be added. Furthermore, some of the elements of the electronic device may be combined with each other so as to form one entity, so that the functions of the elements may be performed in the same manner as before the combination.

Figure 3:
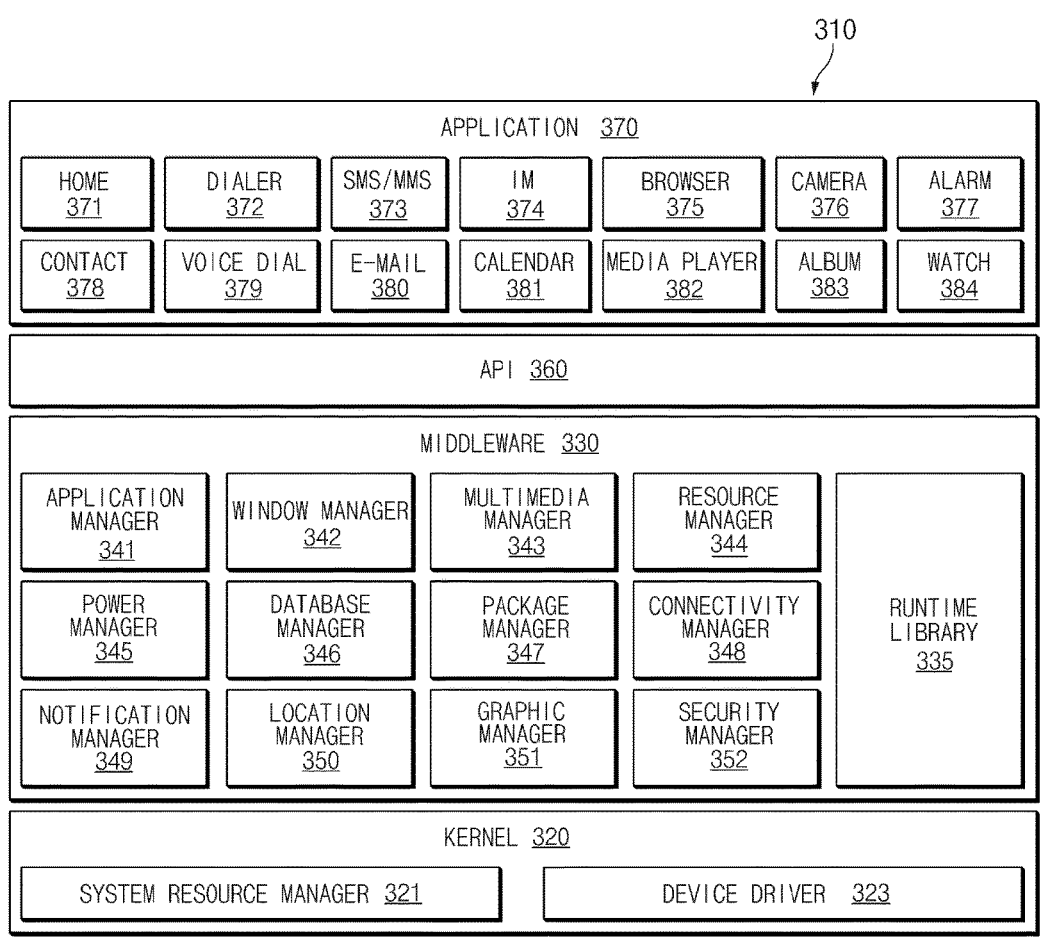
FIG. 3 is a block diagram illustrating an example program module according to various example embodiments.

FIG. 3 is a block diagram illustrating an example program module, according to various example embodiments. According to an embodiment, a program module 310 (e.g., the program 140) may include an operating system (OS) to control resources associated with an electronic device (e.g., the electronic device 101), and/or diverse applications (e.g., the application program 147) driven on the OS. The OS may be, for example, Android™, iOS™, Windows™, Symbian™, Tizen™, or Bada™. The program module 310 may include a kernel 320 (e.g., the kernel 141), a middleware 330 (e.g., the middleware 143), an application programming interface (API) 360 (e.g., the API 145), and/or an application 370 (e.g., the application program 147). At least a portion of the program module 310 may be preloaded on an electronic device or may be downloadable from an external electronic device (e.g., the first electronic device 102, the second electronic device 104, the server 106, or the like).

The kernel 320 (e.g., the kernel 141) may include, for example, a system resource manager 321 and/or a device driver 323. The system resource manager 321 may control, allocate, or retrieve system resources. According to an embodiment, the system resource manager 321 may include a process managing unit, a memory managing unit, a file system managing unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function that the application 370 needs in common, or may provide diverse functions to the application 370 through the API 360 to allow the application 370 to efficiently use limited system resources of the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that is used by a compiler to add a new function through a programming language while the application 370 is being executed. The runtime library 335 may perform input/output management, memory management, or capacities about arithmetic functions. The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a memory space or source code of the application 370. The power manager 345 may manage a battery or power, and may provide power information for an operation of an electronic device. According to an embodiment, the power manager 345 may operate with a basic input/output system (BIOS). The database manager 346 may generate, search for, or modify database that is to be used in the application 370. The package manager 347 may install or update an application that is distributed in the form of package file.

The connectivity manager 348 may manage, for example, wireless connection. The notification manager 349 may provide an event, for example, arrival message, appointment, or proximity notification to a user. For example, the location manager 350 may manage location information about an electronic device. The graphic manager 351 may manage a graphic effect that is provided to a user, or manage a user interface relevant thereto. The security manager 352 may provide, for example, system security or user authentication. According to an embodiment, the middleware 330 may include a telephony manager for managing a voice or video call function of the electronic device or a middleware module that combines diverse functions of the above-described elements. According to an embodiment, the middleware 330 may provide a module specialized to each OS kind to provide differentiated functions. Additionally, the middleware 330 may dynamically remove a part of the preexisting elements or may add new elements thereto. The API 360 may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 370 may include, for example, applications such as a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a watch 384, or the like. Additionally, although not shown, the application 370 may include various applications related to, for example, and without limitation, health care (e.g., measuring an exercise quantity, blood sugar, or the like) or offering of environment information (e.g., information of barometric pressure, humidity, temperature, or the like). According to an embodiment, the application 370 may include an information exchanging application to support information exchange between an electronic device and an external electronic device. The information exchanging application may include, for example, a notification relay application for transmitting specific information to an external electronic device, or a device management application for managing the external electronic device. For example, the notification relay application may include a function of transmitting notification information, which arise from other applications, to an external electronic device or may receive, for example, notification information from an external electronic device and provide the notification information to a user. The device management application may install, delete, or update for example, a function (e.g., turn-on/turn-off of an external electronic device itself (or a part of components) or adjustment of brightness (or resolution) of a display) of the external electronic device which communicates with the electronic device, and an application running in the external electronic device. According to an embodiment, the application 370 may include an application (e.g., a health care application of a mobile medical device) that is assigned in accordance with an attribute of an external electronic device. According to an embodiment, the application 370 may include an application that is received from an external electronic device. At least a portion of the program module 310 may be implemented by software, firmware, hardware (e.g., the processor 210), or a combination (e.g., execution) of two or more thereof, and may include modules, programs, routines, sets of instructions, processes, or the like for performing one or more functions.

Figure 4:
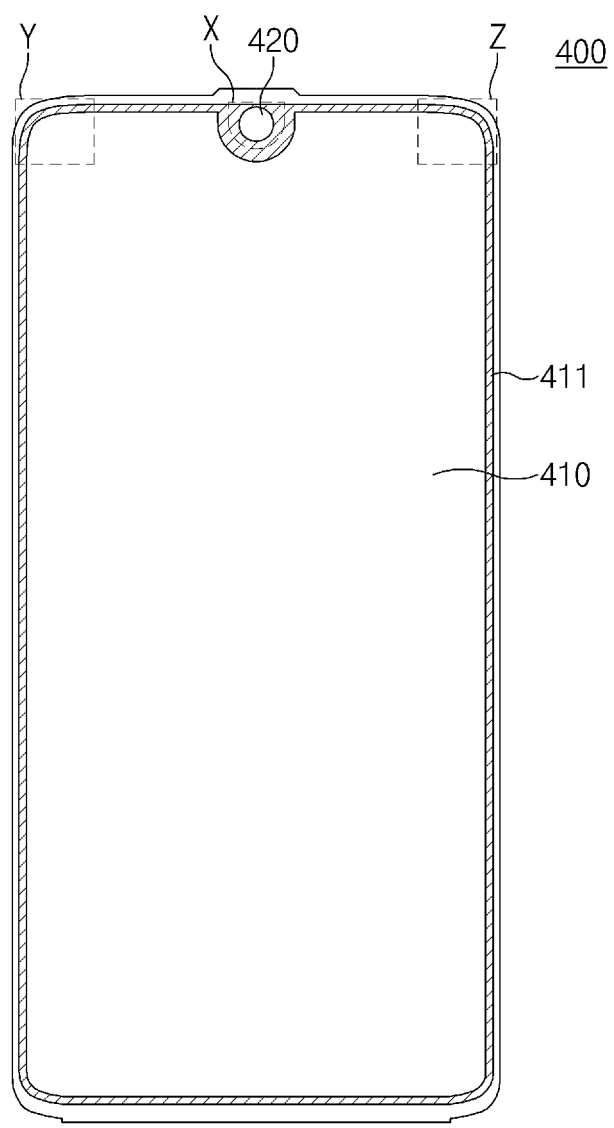
FIG. 4 is a front view illustrating an example electronic device according to an example embodiment.

FIG. 4 is a front view illustrating an example electronic device according to an example embodiment.

Referring to FIG. 4, an electronic device 400 according to an embodiment may include a display 410 and a camera module (e.g., including imaging circuitry) 420. The display 410 may occupy most of a front surface of the electronic device 400. In the case where the area of the display 410 increases, a space through which the display 410 is exposed to the outside may be insufficient. In this case, in a manufacturing process, a portion corresponding to a region "X" of the display 410 may be cut. The camera module 420 may be disposed in a space defined by the cut portion of the display 410 so as to be exposed through the region "X". A peripheral region of the display 410 may be an inactive region 411 (or a black matrix (BM) region).

According to an embodiment of the present disclosure, the display 410 may include, for example, a display panel, a touch sensor, a polarizing plate, an adhesive layer, and/or a cover glass. According to an embodiment, the touch sensor may be integrally formed in the display panel. This may make the thickness of the display 410 thin. If the thickness of the display 410 becomes thin, portions, which correspond to the region "X", of the display panel, the touch sensor, the polarizing plate, and the adhesive layer may be cut at the same time. If the above-described elements are cut at the same time, steps may not exist between the above-described elements, and thus, the area of the inactive region 411 may decrease. For example, the width of the inactive region 411 around the region "X" may be about 0.17 mm.

An embodiment is illustrated in FIG. 4 as the upper middle region "X" of the display 410 is cut. However, embodiments of the present disclosure may not be limited thereto. For example, various portions such as an upper left region "Y" or an upper right region "Z" of the display 410 may be cut, and the camera module 420 may be exposed to the outside through the cut portion. The region "X", the region "Y", and/or the region "Z" may be cut by the same manufacturing method. Also, an outer portion of the display 410 may be cut by the same manufacturing method as the region "X", the region "Y", and/or the region "Z".

Below, a structure of the electronic device 400 will be described in greater detail below with reference to FIGS. 5 and 6, and a method for manufacturing the electronic device 400 will be described in greater detail below with reference to FIGS. 7 and 8.

Figure 5:
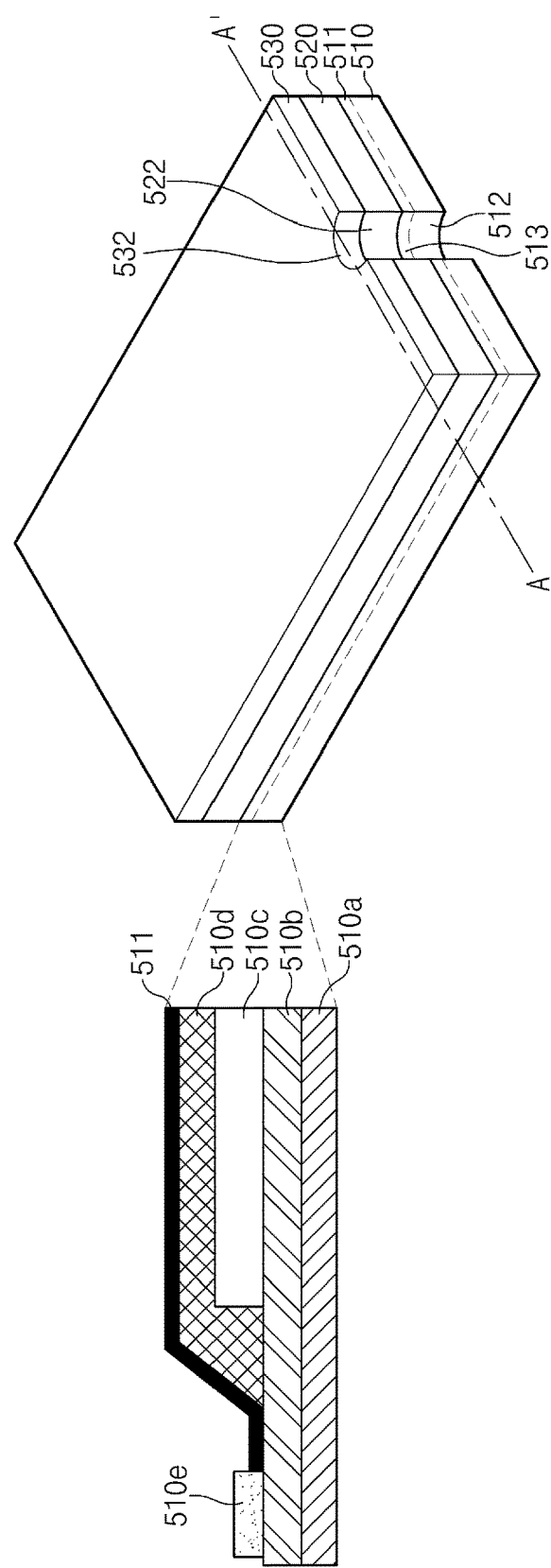
FIG. 5 is a perspective view illustrating an example of a display panel, a polarizing plate, and an adhesive layer included in the example electronic device according to an example embodiment.

FIG. 5 is a perspective view illustrating an example of a display panel, a polarizing plate, and an adhesive layer included in an electronic device according to an example embodiment. FIG. 6 is a sectional view illustrating an example part of an example electronic device according to an example embodiment.

Figure 6:
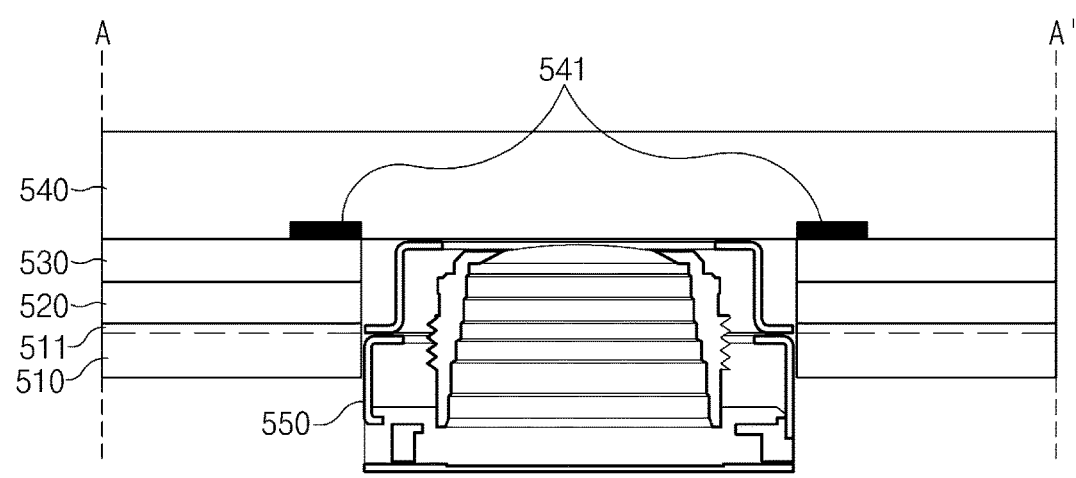
FIG. 6 is a sectional view illustrating a part of an example electronic device according to an example embodiment.

Referring to FIGS. 5 and 6, an electronic device according to an embodiment may include a display panel 510, a polarizing plate 520, an adhesive layer 530, a cover glass 540, and a camera module 550.

According to an embodiment of the present disclosure, the display panel 510 may be formed in a plate shape. An embodiment is illustrated FIGS. 5 and 6 as the display panel 510 is formed in a plate shape. However, embodiments of the present disclosure may not be limited thereto. For example, the display panel 510 may be formed in a curved shape. The display panel 510 may include an active region to output light and an inactive region being the remaining region. A partial region of the display panel 510 may be cut in a thickness direction of the display panel 510. The partial region of the display panel 510 may include a part of the active region of the display panel 510. For example, as illustrated in FIG. 5, the partial region of the display panel 510 may be cut in a U-shape. For another example, the partial region of the display panel 510 may be cut in an O-shape. The display panel 510 may include a substrate 510a, a thin film transistor (TFT) 510b, a light-emitting layer 510c, thin film encapsulation (TFE) 510d, and a pad 510e. The substrate 510a may support other elements of the display panel 510. The substrate 510a may be formed of, for example, polyimide (PI). The TFT 510b may control light emission of the light-emitting layer 510c. The TFT 510b may be formed on the substrate 510a. The light-emitting layer 510c may be disposed on the TFT 510b. The light-emitting layer 510c may include an electrode, an electroluminescence (EL) lamp, and the like. The light-emitting layer 510c may emit light. The TFE 510d may be disposed on the light-emitting layer 510c. The TFE 510d may be configured to protect the light-emitting layer 510c. The pad 510e may be electrically connected with at least a part of another element of the display panel 510. The display panel 510 may be electrically connected with a printed circuit board (or a flexible printed circuit board) through the pad 510e.

According to an embodiment of the present disclosure, a touch sensor 511 may be formed on the display panel 510. The touch sensor 511 may be integrated with the display panel 510. For example, an electrode of the touch sensor 511 may be printed on the TFE 510d of the display panel 510. The touch sensor 511 may be electrically connected with the pad 510e. The touch sensor 511 may be electrically connected with the printed circuit board (or the flexible printed circuit board) through the pad 510e. In this disclosure, the touch panel 510 may be understood as the term including the touch sensor 511 integrated with the display panel 510. Since the touch sensor 511 is integrated with the display panel 510, the thickness of the display panel 510 and the touch sensor 511 may become thin. A partial region of the touch sensor 511, which corresponds to the cut region of the display panel 510 may be cut in a thickness direction of the touch sensor 511. For example, as illustrated in FIG. 5, the partial region of the display sensor 511 may be cut in a U-shape like the partial region of the display panel 510. For another example, in the case where the display panel 510 is cut in an O-shape, the partial region of the display sensor 511 may be cut in the O-shape like the partial region of the display panel 510.

According to an embodiment of the present disclosure, the polarizing plate 520 may be disposed on the display panel 510. For example, the polarizing plate 520 may be attached on the touch sensor 511. A partial region of the polarizing plate 520, which corresponds to the cut region of the display panel 510 may be cut in a thickness direction of the polarizing plate 520. For example, as illustrated in FIG. 5, the partial region of the display sensor 520 may be cut in a U-shape like the partial region of the display panel 510. For another example, in the case where the display panel 510 is cut in an O-shape, the partial region of the polarizing plate 520 may be cut in the O-shape like the partial region of the display panel 510.

According to an embodiment of the present disclosure, the adhesive layer 530 may be attached on the polarizing plate 520. The adhesive layer 530 may be, for example, optical clear adhesive (OCA). A partial region of the adhesive layer 530, which corresponds to the cut region of the display panel 510 may be cut in a thickness direction of the adhesive layer 530. For example, as illustrated in FIG. 5, the partial region of the adhesive layer 530 may be cut in a U-shape like the partial region of the display panel 510. For another example, in the case where the display panel 510 is cut in an O-shape, the partial region of the adhesive layer 530 may be cut in the O-shape like the partial region of the display panel 510.

According to an embodiment of the present disclosure, the camera module 550 may be disposed in a space defined by a cut surface 512 of the display panel 510, a cut surface 513 of the touch sensor 511, a cut surface 522 of the polarizing plate 520, and a cut surface 532 of the adhesive layer 530. The camera module 550 may be the camera module 291 illustrated in FIG. 2.

According to an embodiment of the present disclosure, the cover glass 540 may be attached on the adhesive layer 530. The cover glass 540 may be formed in a plate shape or a curved shape depending on a shape of the display panel 510 or the like. The cover glass 540 may cover the display panel 510, the touch sensor 511, the polarizing plate 520, and the adhesive layer 530. The cover glass 540 may include a layer 541 that is printed on a region corresponding to the inactive region 411 illustrated in FIG. 4.

According to an embodiment, the cut surface 512 of the display panel 510, the cut surface 513 of the touch sensor 511, the cut surface 522 of the polarizing plate 520, and the cut surface 532 of the adhesive layer 530 may be substantially the same. According to an embodiment, the cut surface 512 of the display panel 510, the cut surface 513 of the touch sensor 511, the cut surface 522 of the polarizing plate 520, and the cut surface 532 of the adhesive layer 530 may be formed to coincide with each other in a thickness direction of the display panel 510. For example, an upper end of the cut surface 512 of the display panel 510 and a lower end of the cut surface 513 of the touch sensor 511 may coincide with each other. Also, an upper end of the cut surface 513 of the touch sensor 511 and a lower end of the cut surface 522 of the polarizing plate 520 may coincide with each other. Also, an upper end of the cut surface 522 of the polarizing plate 520 and a lower end of the cut surface 532 of the adhesive layer 530 may coincide with each other. The cut surface 512 of the display panel 510, the cut surface 513 of the touch sensor 511, the cut surface 522 of the polarizing plate 520, and the cut surface 532 of the adhesive layer 530 may form a smooth surface without steps.

According to an embodiment, the cut region of the display panel 510, the cut region of the touch sensor 511, the cut region of the polarizing plate 520, and the cut region of the adhesive layer 530 may be cut at the same time. In the case where the display panel 510 and the touch sensor 511 are provided separately, if the display panel 510, the touch sensor 511, the polarizing plate 520, and the adhesive layer 530 are cut at the same time, at least a part of the cut elements may be damaged. The reason is that the thickness of the cut elements is thick. According to an embodiment of the present disclosure, since the display panel 510 and the touch sensor 511 are integrally formed, the thickness of elements to be cut may become thin. Accordingly, the display panel 510, the touch sensor 511, the polarizing plate 520, and the adhesive layer 530 may be cut at the same time without damaging the cut elements. Since the display panel 510, the touch sensor 511, the polarizing plate 520, and the adhesive layer 530 are cut at the same time, the cut surface 512 of the display panel 510, the cut surface 513 of the touch sensor 511, the cut surface 522 of the polarizing plate 520, and the cut surface 532 of the adhesive layer 530 may be formed to coincide with each other.

As described above, since the cut surface 512 of the display panel 510, the cut surface 513 of the touch sensor 511, the cut surface 522 of the polarizing plate 520, and the cut surface 532 of the adhesive layer 530 are formed to coincide with each other, the area of an inactive region (e.g., the inactive region 411 of FIG. 4) of the display may decrease.

Figure 7:
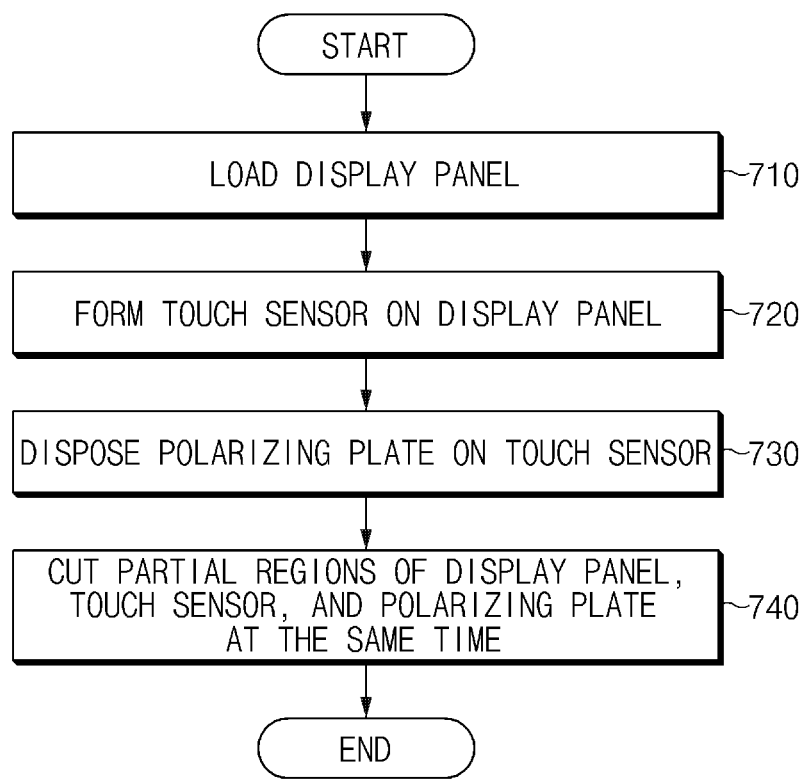
FIG. 7 is a flowchart illustrating an example display manufacturing method according to an example embodiment.

FIG. 7 is a flowchart illustrating an example display manufacturing method according to an example embodiment. FIG. 8 is a process diagram illustrating an example display manufacturing method according to an example embodiment.

Figure 8:
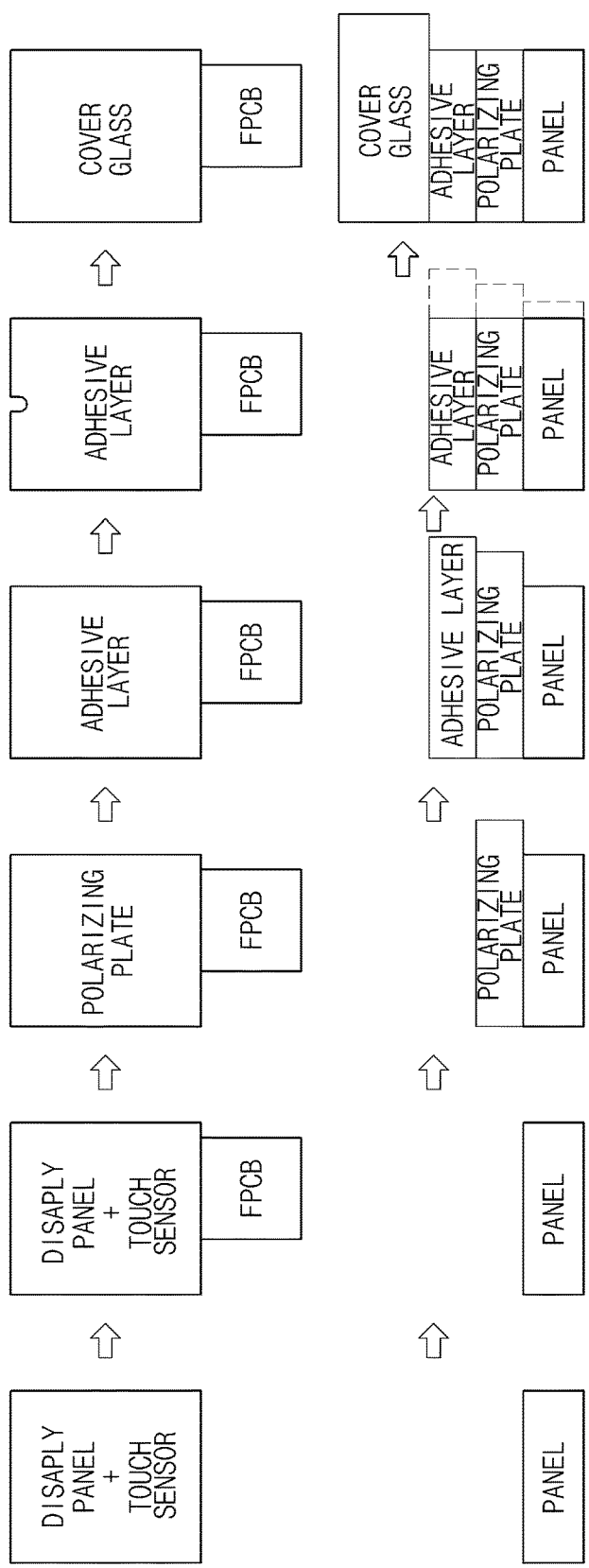
FIG. 8 is a process diagram illustrating an example display manufacturing method according to an example embodiment.

Referring to FIGS. 7 and 8, in operation 710, a display panel may be loaded. For example, the display panel may be loaded on a location at which a manufacturing process to be described below will be performed.

In operation 720, a touch sensor may be formed on the display panel so as to be integrated with the display panel. For example, an electrode of the touch sensor may be printed on the display panel through a mask. The touch sensor may be formed on the display panel by forming an encapsulation layer on the printed electrode. The display panel and the touch sensor may be implemented with one module.

According to an embodiment, after the display panel is loaded, a flexible printed circuit board (FPCB) may be connected to the display panel. For example, the FPCB may be pressed to a lower end of the display panel. If the FPCB is pressed to the display panel, the FPCB may be electrically connected with the display panel.

In operation 730, a polarizing plate may be disposed on the touch sensor. For example, the polarizing plate may include an adhesive tape attached on a rear surface of the polarizing plate. The polarizing plate may be attached on the touch sensor by the adhesive tape.

According to an embodiment, an adhesive layer may be disposed on the polarizing plate. For example, the adhesive layer may be an OCA film and may be attached on a front surface of the polarizing plate.

In operation 740, after the polarizing plate is disposed, partial regions of the display panel, the touch sensor, and the polarizing plate may be cut at the same time. For example, the partial regions of the display panel, the touch sensor, and the polarizing plate may be cut by laser cutting. For example, the partial regions of the display panel, the touch sensor, and the polarizing plate may be cut by pinnacle cutting. According to an embodiment, the partial region of the display panel may include a part of an active region of the display panel.

According to an embodiment, in the case where the adhesive layer is disposed on the polarizing plate, the partial regions of the display panel, the touch sensor, and the polarizing plate may be cut at the same time after the adhesive layer is disposed.

According to an embodiment, a cover glass may be disposed on the adhesive layer. The cover glass may cover the display panel, the touch sensor, the polarizing plate, and the adhesive layer.

As described above, cut surfaces of the display panel, the touch sensor, and the polarizing plate (or the display panel, the touch sensor, the polarizing plate, and the adhesive layer) may be formed to coincide with each other without steps, as illustrated in FIG. 8, by cutting the display panel, the touch sensor, and the polarizing plate (or the display panel, the touch sensor, the polarizing plate, and the adhesive layer) at the same time.

Figure 9:
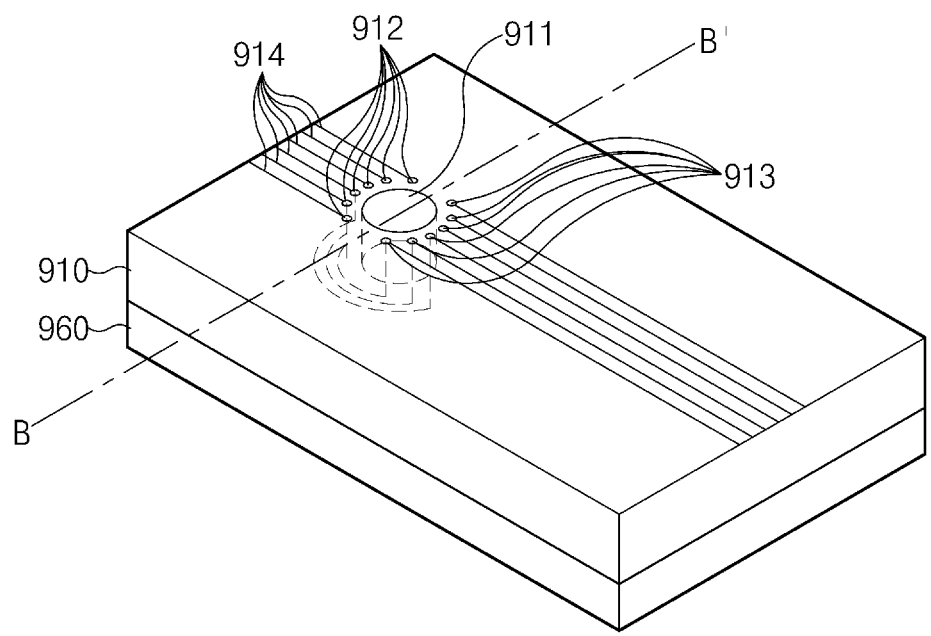
FIG. 9 is a perspective view illustrating an example display panel included in the electronic device according to an example embodiment.
Figure 10:
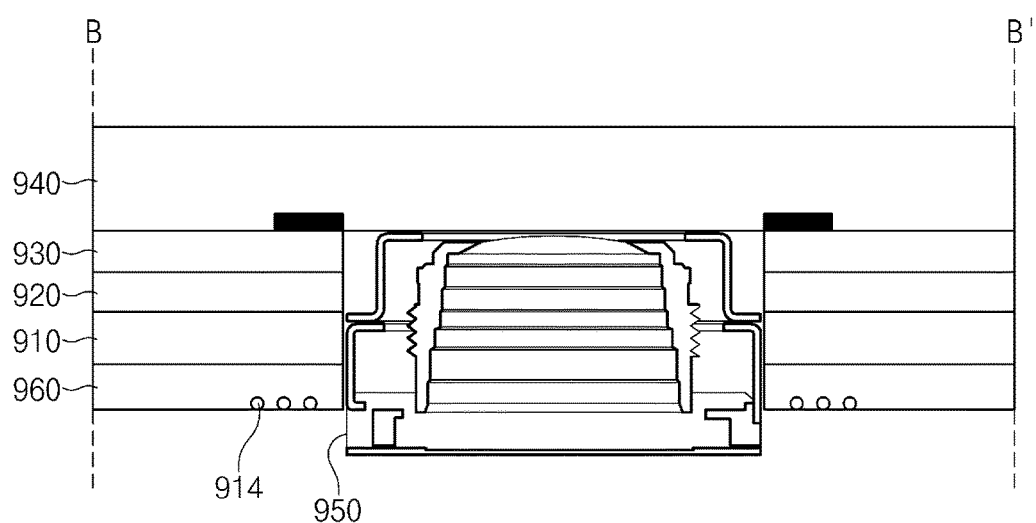
FIG. 10 is a sectional view illustrating a part of an example electronic device according to an example embodiment.

FIG. 9 is a perspective view illustrating an example display panel included in an example electronic device according to an example embodiment. FIG. 10 is a sectional view illustrating a part of an example electronic device according to an example embodiment.

Referring to FIGS. 9 and 10, an electronic device may include a substrate 960, a display panel 910, a polarizing plate 920, an adhesive layer 930, a cover glass 940, and a camera module 950. The display panel 910, the polarizing plate 920, the adhesive layer 930, the cover glass 940, and the camera module 950 are similar to the display panel 510, the polarizing plate 520, the adhesive layer 530, the cover glass 540, and the camera module 550 illustrated in FIGS. 5 and 6, and thus, a description thereof will not be repeated here.

According to an embodiment, a hole 911 may be formed in a partial region including a part of an active region of the display panel 910. The camera module 950 may be disposed within the hole 911. Also, the hole 911 may be formed in the polarizing plate 920 and the adhesive layer 930 so as to coincide with the hole 911 formed in the display panel 910. The hole 911 may be formed by cutting the display panel 910, the polarizing plate 920, and the adhesive layer 930 at the same time.

According to an embodiment, vias 912 and 913 may be formed in a surrounding region of the hole 911 of the display panel 910. An embodiment is illustrated in FIG. 9 as 12 vias 912 and 913 are formed. However, embodiments of the present disclosure may not be limited thereto. For example, the vias 912 and 913, the number of which corresponds to the number of data lines 914 arranged around the hole 911 of the display panel 910, may be formed in the surrounding region of the hole 911. A diameter of each of the vias 912 and 913 may be, for example, and without limitation, 0.05 mm.

According to an embodiment, the display panel 910 may include the data lines 914 arranged in a vertical direction. The data lines 914 may be disposed around the hole 911. Although not illustrated in FIGS. 9 and 10, the display panel 910 may include the data lines arranged in a vertical direction on the left and the right of the hole 911 and may include scan lines arranged in a horizontal direction.

According to an embodiment, the data lines 914 may extend from an upper end of the display panel 910 to the surrounding region of the hole 911 above the vias 912 and 913. The data lines 914 may extend from the upper end of the display panel 910 to the vias 912 arranged on an upper side of the hole 911. The data lines 914 may be inserted into the vias 912 arranged on the upper side of the hole 911. The data lines 914 may extend toward a rear surface of the display panel 910 through the vias 912 arranged on the upper side of the hole 911. For example, the data lines 914 may extend to the substrate 960 through the vias 912 arranged on the upper side of the hole 911. The data lines 914 may bypass the hole 911 below the vias 912 and 913 and may extend to the vias 913 arranged on a lower side of the hole 911. For example, the data lines 914 may bypass the hole 911 within the substrate 960 to extend to the vias 913 arranged on the lower side of the hole 911. The data lines 914 may be inserted into the vias 913 arranged on the lower side of the hole 911. The data lines 914 may extend toward a front surface of the display panel 910 through the vias 913 arranged on the lower side of the hole 911. The data lines 914 may extend from the surrounding region of the hole 911 to a lower end of the display panel 910 above the vias 913 arranged on the lower side of the hole 911.

As described above, the area of an inactive region needed to arrange the data lines 914 may decrease by disposing the data lines 914 such that the data lines 914 bypass the hole 911 below the display panel 910 after passing through the vias 912.

Figure 11:
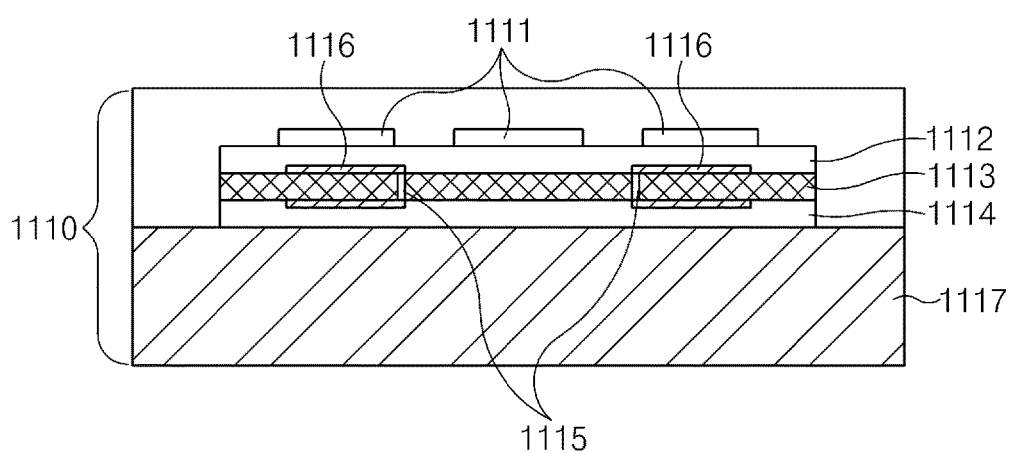
FIG. 11 is a sectional view illustrating a part of an example electronic device according to an example embodiment.

FIG. 11 is a sectional view illustrating a part of an example electronic device according to an embodiment.

Referring to FIG. 11, according to an embodiment, a display panel 1110 may include a light-emitting device 1111, a first circuit unit (e.g., including a circuit element) 1112, an insulating layer 1113, a second circuit unit (e.g., including a circuit element) 1114, and a substrate 1117. The substrate 1117 may support other elements of the display panel 1110. The second circuit unit 1114 may be formed on the substrate 1117. The insulating layer 1113 may be formed on the second circuit unit 1114. The first circuit unit 1112 may be formed on the insulating layer 1113. The light-emitting device 1111 may be formed on the first circuit unit 1112.

According to an embodiment, vias 1115 may be formed within the display panel 1110. For example, the vias 1115 may be formed in the insulating layer 1113. The vias 1115 may be formed to pass through a part of the first circuit unit 1112, the insulating layer 1113, and a part of the second circuit unit 1114.

According to an embodiment, the display panel 1110 may include data lines 1116. The data lines 1116 may be disposed in the first circuit unit 1112. For example, the data lines 1116 may extend from an upper end of the display panel 1110 through the first circuit unit 1112. The data lines 1116 may extend from the first circuit unit 1112 to the second circuit unit 1114 through the vias 1115. The data lines 1116 may bypass a hole (e.g., the hole 911 of FIG. 9) formed in the display panel 1110 and may extend through the second circuit unit 1114. The data lines 1116 may extend to the first circuit unit 1112 through the vias 1115 after bypassing the hole formed in the display panel 1110. The data lines 1116 may extend to a lower end of the display panel 1110 through the first circuit unit 1112.

Figure 12:
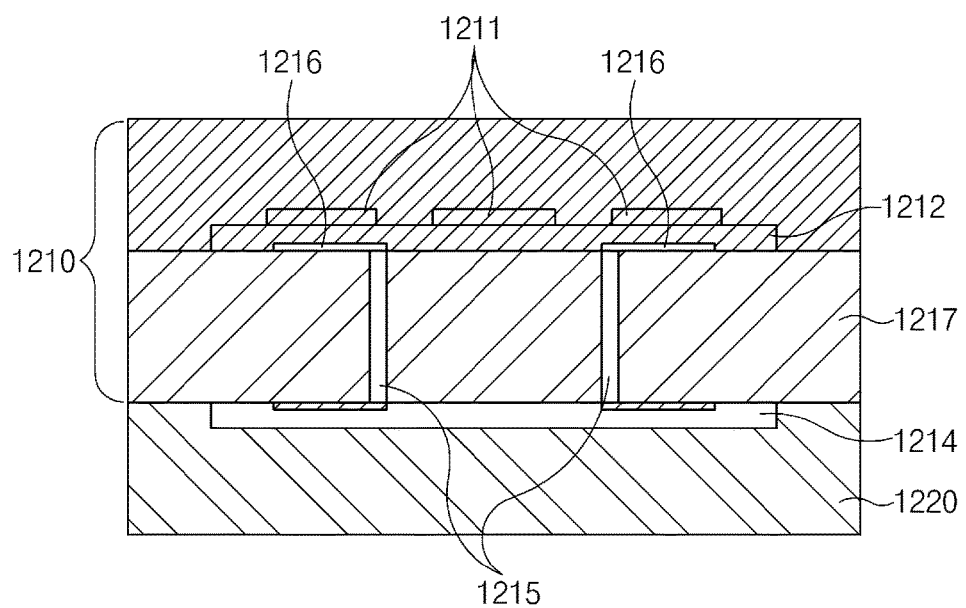
FIG. 12 is a sectional view illustrating a part of an example electronic device according to an example embodiment.

FIG. 12 is a sectional view illustrating a part of an example electronic device according to an example embodiment.

Referring to FIG. 12, according to an embodiment, a display panel 1210 may include a light-emitting device 1211, a first circuit unit (e.g., including a circuit element) 1212, a second circuit unit (e.g., including a circuit element) 1214, and an internal substrate 1217. The internal substrate 1217 may support other elements of the display panel 1210. The second circuit unit 1214 may be formed under the internal substrate 1217. The first circuit unit 1212 may be formed on the internal substrate 1217. The light-emitting device 1211 may be formed on the first circuit unit 1212. A display panel 1210 may be formed on a substrate 1220.

According to an embodiment, vias 1215 may be formed within the display panel 1210. For example, the vias 1215 may be formed in the substrate 1217. The vias 1215 may be formed to pass through a part of the first circuit unit 1212, the substrate 1217, and a part of the second circuit unit 1214.

According to an embodiment, the display panel 1210 may include data lines 1216. The data lines 1216 may be disposed in the first circuit unit 1212. For example, the data lines 1216 may extend from an upper end of the display panel 1210 through the first circuit unit 1212. The data lines 1216 may extend from the first circuit unit 1212 to the second circuit unit 1214 through the vias 1215. The data lines 1216 may bypass a hole (e.g., the hole 911 of FIG. 9) formed in the display panel 1210 and may extend through the second circuit unit 1214. The data lines 1216 may extend to the first circuit unit 1212 through the vias 1215 after bypassing the hole formed in the display panel 1210. The data lines 1216 may extend to a lower end of the display panel 1210 through the first circuit unit 1212.

The display panel 1210 and the substrate 1220 are illustrated in FIG. 12 as being independent of each other. However, embodiments of the present disclosure may not be limited thereto. For example, the substrate 1220 may be an element that is included in the display panel 1210. For another example, the substrate 1220 may be a shield layer such as a cover panel or the like.

Figure 13:
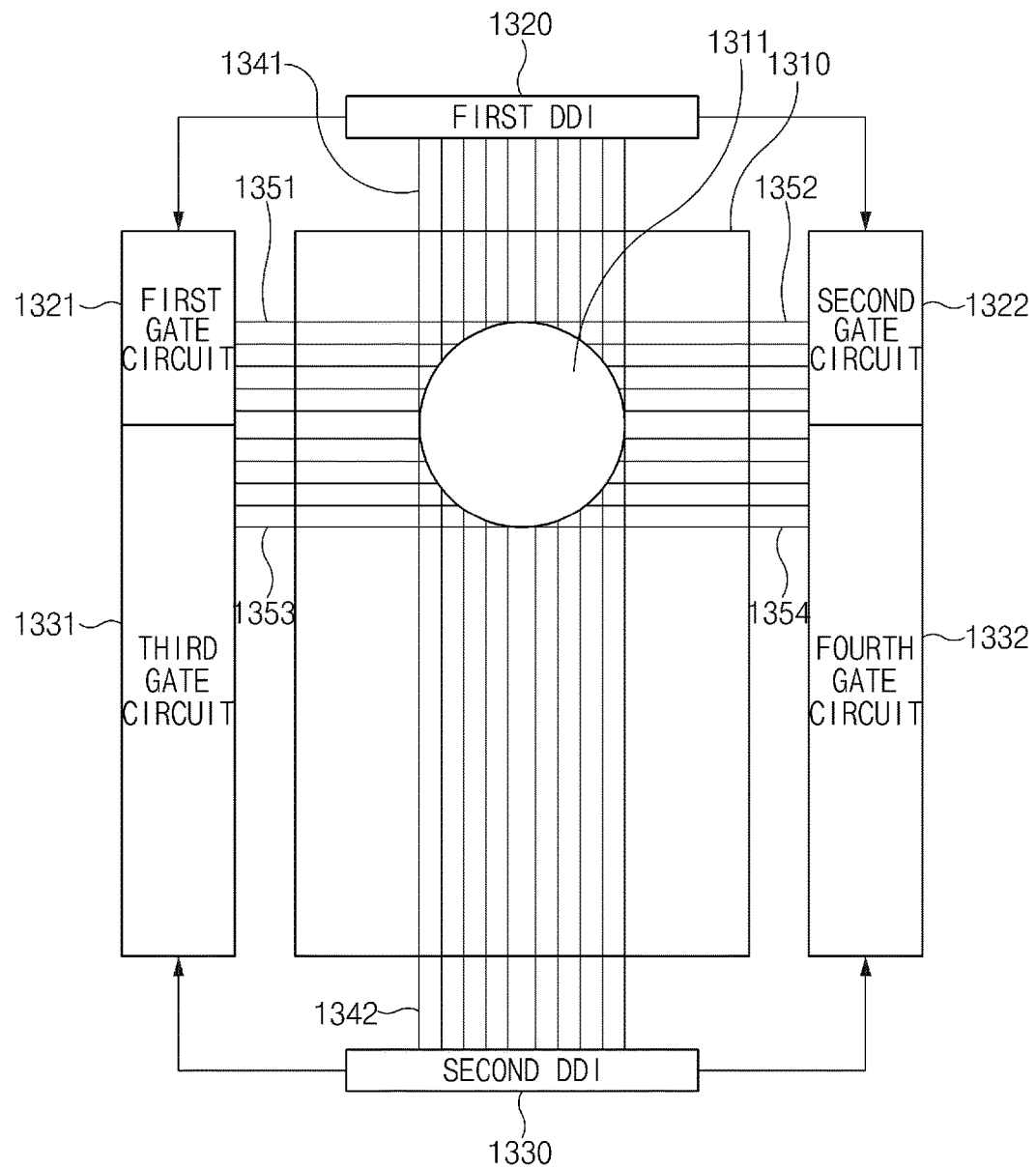
FIG. 13 is a diagram illustrating an example circuit structure of a display included in an example electronic device according to an example embodiment.

FIG. 13 is a diagram illustrating an example circuit structure of a display included in an example electronic device according to an example embodiment.

Referring to FIG. 13, an electronic device according to an embodiment may include a display panel 1310, a display driver integrated circuit (DDI) 1320, a second DDI 1330, a first gate circuit 1321, a second gate circuit 1322, a third gate circuit 1331, and a fourth gate circuit 1332. A hole 1311 may be formed in a partial region including a part of an active region of the display panel 1310.

According to an embodiment of the present disclosure, the first DDI 1320 may be disposed at an upper end of the display panel 1310. The first DDI 1320 may be electrically connected with the first gate circuit 1321 and the second gate circuit 1322. The first gate circuit 1321 may be electrically connected with scan lines 1351. The scan lines 1351 may extend from the first gate circuit 1321 to the left of the hole 1311. The second gate circuit 1322 may be electrically connected with scan lines 1352. The scan lines 1352 may extend from the second gate circuit 1322 to the right of the hole 1311.

According to an embodiment, the first DDI 1320 may be electrically connected with data lines 1341. The data lines 1341 may extend from an upper end of the display panel 1310 to an upper side of the hole 1311.

According to an embodiment of the present disclosure, the second DDI 1330 may be disposed at a lower end of the display panel 1310. The second DDI 1330 may be electrically connected with the third gate circuit 1331 and the fourth gate circuit 1332. The third gate circuit 1331 may be electrically connected with scan lines 1353. The scan lines 1353 may extend from the third gate circuit 1331 to the left of the hole 1311. The fourth gate circuit 1332 may be electrically connected with scan lines 1354. The scan lines 1354 may extend from the fourth gate circuit 1332 to the right of the hole 1311.

According to an embodiment, the second DDI 1330 may be electrically connected with data lines 1342. The data lines 1342 may extend from a lower end of the display panel 1310 to a lower side of the hole 1311.

As described above, the area of an inactive region needed to arrange the data lines 1341 and 1342 may decrease by supplying signals to data lines by using the two DDIs 1320 and 1330.

An electronic device according to an example embodiment may include a display panel, a partial region of the display panel including an active region configured to output light and including a cut in a thickness direction of the display panel, a touch sensor formed on the display panel, a partial region of the touch sensor corresponding to the cut region of the display panel, including cut in a thickness direction of the touch sensor, and a polarizing plate disposed on the display panel, a partial region of the polarizing plate corresponding to the cut region of the display panel, including a cut in a thickness direction of the polarizing plate, wherein a cut surface of the display panel, a cut surface of the touch sensor, and a cut surface of the polarizing plate may be formed to coincide with each other.

According to an example embodiment, the cut region of the display panel, the cut region of the touch sensor, and the cut region of the polarizing plate may be cut at the same time.

According to an example embodiment, an adhesive layer may be attached on the polarizing plate, a partial region of the adhesive layer corresponding to the cut region of the display panel, including a cut in a thickness direction of the adhesive layer. The cut surface of the display panel, the cut surface of the touch sensor, the cut surface of the polarizing plate, and a cut surface of the adhesive layer may be formed to coincide with each other.

According to an example embodiment, the cut region of the display panel, the cut region of the touch sensor, the cut region of the polarizing plate, and the cut region of the adhesive layer may be cut at the same time.

According to an example embodiment, the electronic device may further include a cover glass attached on the adhesive layer and covering the display panel, the touch sensor, the polarizing plate, and the adhesive layer.

According to an example embodiment, the electronic device may further include a camera module disposed in a space defined by the cut surface of the display panel, the cut surface of the touch sensor, and the cut surface of the polarizing plate.

According to an example embodiment, the cut region of the display panel may be cut in a U-shape or an O-shape.

According to an example embodiment, an electrode included in the touch sensor may be printed on the display panel.

According to an example embodiment, the display panel may include a plurality of data lines extending in a vertical direction of the display panel, a hole may be formed in a partial region including at least a part of the active region of the display panel, a plurality of vias may be formed in a region surrounding the hole, and a part of the plurality of data lines may extend from an upper end of the display panel to the surrounding region of the hole above the plurality of vias, may be inserted into a via arranged on an upper side of the hole among the plurality of vias, may pass through the vias arranged on the upper side of the hole, may bypass the hole below the plurality of vias to extend to a via arranged on a lower side of the hole, may be inserted into the via arranged on the lower side of the hole, and may pass through the via arranged on the lower side of the hole to extend from the surrounding region of the hole to a lower end of the display panel above the plurality of vias.

According to an example embodiment, the electronic device may further include a first display driver integrated circuit (DDI) disposed at an upper end of the display panel, and a second DDI disposed at a lower end of the display panel. A hole may be formed in a partial region including at least a part of the active region of the display panel, at least a part of a data line connected with the first DDI may extend from the upper end of the display panel to an upper side of the hole, and at least a part of a data line connected with the second DDI may extend from the lower end of the display panel to a lower side of the hole.

According to an example embodiment, a method for manufacturing a display included in an electronic device may include loading a display panel, forming a touch sensor on the display panel, disposing a polarizing plate on the touch sensor, and cutting partial regions of the display panel, the touch sensor, and the polarizing plate at the same time after the polarizing plate is disposed, and the partial region of the display panel may include a part of an active region of the display panel.

According to an example embodiment, the method may further include attaching an adhesive layer on the polarizing plate, and the cutting may include cutting the partial regions of the display panel, the touch sensor, and the polarizing plate and a partial region of the adhesive layer at the same time after the adhesive layer is disposed.

According to an example embodiment, the method may further include attaching a cover glass covering the display panel, the touch sensor, the polarizing plate, and the adhesive layer, on the adhesive layer.

According to an example embodiment, the method may further include connecting a flexible printed circuit board (FPCB) with the display panel after the display panel is loaded.

According to an example embodiment, the cutting may include cutting the partial regions of the display panel, the touch sensor, and the polarizing plate by using a laser.

An electronic device according to an embodiment may include a display panel, a partial region of the display panel including an active region configured to output light and including a cut in a thickness direction of the display panel, a touch sensor formed on the display panel, a partial region of the touch sensor corresponding to a cut region of the display panel, including a cut in a thickness direction of the touch sensor, and a polarizing plate disposed on the display panel, a partial region of the polarizing plate, corresponding to the cut region of the display panel, including a cut in a thickness direction of the polarizing plate, wherein the cut region of the display panel, the cut region of the touch sensor, and the cut region of the polarizing plate may be cut at the same time.

According to an example embodiment, the electronic device may further include an adhesive layer attached on the polarizing plate, a partial region of the adhesive layer corresponding to the cut region of the display panel, including a cut in a thickness direction of the adhesive layer. The cut region of the display panel, a cut region of the touch sensor, a cut region of the polarizing plate, and a cut region of the adhesive layer may be cut at the same time.

According to an example embodiment, the electronic device may further include a cover glass attached on the adhesive layer and covering the display panel, the touch sensor, the polarizing plate, and the adhesive layer.

According to an example embodiment, the electronic device may further include a camera module disposed in a space defined by a cut surface of the display panel, a cut surface of the touch sensor, and a cut surface of the polarizing plate.

According to an example embodiment, the cut region of the display panel, the cut region of the touch sensor, and the cut region of the polarizing plate may be cut using a laser.

The term "module" used in this disclosure may include a unit composed of hardware, software and firmware or any combination thereof and may be interchangeably used with the terms "unit", "logic", "logical block", "component" and "circuit". The "module" may be an integrated component or may be a minimum unit for performing one or more functions or a part thereof. The "module" may be implemented mechanically or electronically and may include, for example, and without limitation, at least one of a dedicated processor, a CPU, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in computer-readable storage media (e.g., the memory 130) in the form of a program module. The instructions, when executed by a processor (e.g., the processor 120), may cause the processor to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and an internal memory. Also, a program instruction may include not only a mechanical code such as things generated by a compiler but also a high-level language code executable on a computer using an interpreter. A module or a program module according to various embodiments may include at least one of the above elements, or a part of the above elements may be omitted, or other elements may be further included. Operations performed by a module, a program module, or other elements according to various embodiments may be executed sequentially, in parallel, repeatedly, or in a heuristic method or some operations may be executed in different sequences or may be omitted. Alternatively, other operations may be added.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display panel, including a thin film encapsulation disposed on a light-emitting layer of the display panel, wherein a partial region of the display panel including an active region configured to output light includes a cut in a thickness direction of the display panel, and wherein for the cut of the display panel a portion of the partial region of the display panel is removed and the cut extends through the display panel;
a touch sensor formed on the display panel, wherein a partial region of the touch sensor corresponding to a cut region of the display panel comprising the cut of the display panel, includes a cut in a thickness direction of the touch sensor, wherein for the cut of the touch sensor a portion of the partial region of the touch sensor is removed and the cut extends through the touch sensor, and electrodes of the touch sensor are printed on the thin film encapsulation of the display panel; and
a polarizing plate disposed on the display panel, wherein a partial region of the polarizing plate corresponding to the cut region of the display panel, includes a cut in a thickness direction of the polarizing plate and for the cut of the polarizing plate a portion of the partial region of the polarizing plate is removed and the cut extends through the polarizing plate,
wherein a cut surface of the cut of the display panel, a cut surface of the cut of the touch sensor, and a cut surface of the cut of the polarizing plate are formed to coincide with each other.

2. The electronic device of claim 1, wherein the cut region of the display panel, a cut region of the touch sensor, and a cut region of the polarizing plate are cut at the same time.

3. The electronic device of claim 1, further comprising:
an adhesive layer attached on the polarizing plate, wherein a partial region of the adhesive layer corresponding to the cut region of the display panel, includes a cut in a thickness direction of the adhesive layer,
wherein the cut surface of the display panel, the cut surface of the touch sensor, the cut surface of the polarizing plate, and a cut surface of the adhesive layer are formed to coincide with each other.

4. The electronic device of claim 3, wherein the cut region of the display panel, a cut region of the touch sensor, a cut region of the polarizing plate, and a cut region of the adhesive layer are cut at the same time.

5. The electronic device of claim 3, further comprising:
a cover glass attached on the adhesive layer and configured to cover the display panel, the touch sensor, the polarizing plate, and the adhesive layer.

6. The electronic device of claim 1, further comprising:
a camera module disposed in a space defined by the cut surface of the display panel, the cut surface of the touch sensor, and the cut surface of the polarizing plate.

7. The electronic device of claim 1, wherein the cut region of the display panel is a region that is cut in a U-shape or an O-shape.

8. The electronic device of claim 1, wherein an electrode included in the touch sensor is printed on the display panel.

9. The electronic device of claim 1, wherein the display panel includes a plurality of data lines extending in a vertical direction of the display panel,
wherein a hole is formed in a partial region of the display panel including at least a part of the active region of the display panel,
wherein a plurality of vias are formed in a region surrounding the hole, and
wherein a part of the plurality of data lines extends from an upper end of the display panel to the surrounding region of the hole above the plurality of vias, are inserted into a via arranged on an upper side of the hole among the plurality of vias, pass through the via arranged on the upper side of the hole, bypass the hole below the plurality of vias to extend to a via arranged on a lower side of the hole, are inserted into the via arranged on the lower side of the hole, pass through the via arranged on the lower side of the hole, and extend from the region surrounding the hole to a lower end of the display panel above the plurality of vias.

10. The electronic device of claim 1, further comprising:
a first display driver integrated circuit (DDI) disposed at an upper end of the display panel; and
a second DDI disposed at a lower end of the display panel,
wherein a hole is formed in a partial region of the display panel including at least a part of the active region of the display panel,
wherein at least a part of a data line connected with the first DDI extends from the upper end of the display panel to an upper side of the hole, and
wherein at least a part of a data line connected with the second DDI extends from the lower end of the display panel to a lower side of the hole.

11. A method for manufacturing a display included in an electronic device, the method comprising:
loading a display panel, including a thin film encapsulation disposed on a light-emitting later of the display panel;
forming a touch sensor on the display panel by printing electrodes of the touch sensor on the thin film encapsulation of the display panel;
disposing a polarizing plate on the touch sensor; and removing partial regions of the display panel, the touch sensor, and the polarizing plate at the same time after the polarizing plate is disposed on the touch sensor and forming cuts of the display panel, the touch sensor, and the polarizing plate, wherein the cuts of the display panel, the touch sensor, and the polarizing plate extend through the display panel, the touch sensor, and the polarizing plate, respectively, wherein the partial region of the display panel includes a part of an active region of the display panel.

12. The method of claim 11, further comprising:
attaching an adhesive layer on the polarizing plate,
wherein the cutting includes:
cutting the partial regions of the display panel, the touch sensor, and the polarizing plate and a partial region of the adhesive layer at the same time after the adhesive layer is disposed.

13. The method of claim 12, further comprising:
attaching a cover glass on the adhesive layer covering the display panel, the touch sensor, the polarizing plate, and the adhesive layer.

14. The method of claim 11, further comprising:
connecting a flexible printed circuit board (FPCB) with the display panel after the display panel is loaded.

15. The method of claim 11, wherein the cutting includes:
cutting the partial regions of the display panel, the touch sensor, and the polarizing plate using a laser.

16. An electronic device comprising:
a display panel, including a thin film encapsulation disposed on a light-emitting layer of the display panel, wherein a partial region of the display panel including an active region configured to output light includes a cut in a thickness direction of the display panel and the cut of the display panel is that a portion of the partial region of the display panel is removed and the cut extends through the display panel;
a touch sensor formed on the display panel, wherein a partial region of the touch sensor corresponding to a cut region of the display panel comprising the cut of the display panel, includes a cut in a thickness direction of the touch sensor, the cut of the touch sensor is that a portion of the partial region of the touch sensor is removed and extends through the touch sensor and electrodes of the touch sensor are printed on the thin film encapsulation of the display panel; and
a polarizing plate disposed on the display panel, wherein a partial region of the polarizing plate corresponding to the cut region of the display panel, includes a cut in a thickness direction of the polarizing plate and the cut of the polarizing plate is that a portion of the partial region of the polarizing plate is removed and extends through the polarizing plate,
wherein the cut region of the cut of the display panel, a cut region of the cut of the touch sensor, and a cut region of the cut of the polarizing plate are cut at the same time.

17. The electronic device of claim 16, further comprising:
an adhesive layer attached to the polarizing plate, wherein a partial region of the adhesive layer corresponding to the cut region of the display panel, includes a cut in a thickness direction of the adhesive layer,
wherein the cut region of the display panel, the cut region of the touch sensor, the cut region of the polarizing plate, and a cut region of the adhesive layer are cut at the same time.

18. The electronic device of claim 17, further comprising:
a cover glass attached on the adhesive layer and configured to cover the display panel, the touch sensor, the polarizing plate, and the adhesive layer.

19. The electronic device of claim 16, further comprising:
a camera module disposed in a space defined by a cut surface of the display panel, a cut surface of the touch sensor, and a cut surface of the polarizing plate.

20. The electronic device of claim 16, wherein the cut region of the display panel, the cut region of the touch sensor, and the cut region of the polarizing plate are cut using a laser.

* * * * *